United States Patent
Kim et al.

(10) Patent No.: US 9,060,359 B2
(45) Date of Patent: Jun. 16, 2015

(54) METHOD AND APPARATUS FOR TRANSCEIVING DATA IN A WIRELESS LAN SYSTEM

(75) Inventors: Suhwook Kim, Anyang-si (KR); Daewon Lee, Anyang-si (KR); Jaewon Lim, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 13/699,991

(22) PCT Filed: May 26, 2011

(86) PCT No.: PCT/KR2011/003865
§ 371 (c)(1),
(2), (4) Date: Nov. 26, 2012

(87) PCT Pub. No.: WO2011/149285
PCT Pub. Date: Dec. 1, 2011

(65) Prior Publication Data
US 2013/0070642 A1      Mar. 21, 2013

Related U.S. Application Data

(60) Provisional application No. 61/348,250, filed on May 26, 2010, provisional application No. 61/425,206, filed on Dec. 20, 2010.

(51) Int. Cl.
*H04L 12/28* (2006.01)
*H04W 72/04* (2009.01)
(Continued)

(52) U.S. Cl.
CPC .......... *H04W 72/0413* (2013.01); *H04W 84/12* (2013.01); *H04W 52/0216* (2013.01); *H04W 52/0219* (2013.01); *H04W 74/006* (2013.01); *H04W 74/08* (2013.01); *Y02B 60/50* (2013.01)

(58) Field of Classification Search
CPC .................................................. H04W 72/0413
USPC .......................................................... 370/254
See application file for complete search history.

(56) References Cited

U.S. PATENT DOCUMENTS

| 8,472,383 | B1* | 6/2013 | Banerjea et al. | 370/328 |
| 2007/0086413 | A1* | 4/2007 | Jang et al. | 370/347 |

(Continued)

FOREIGN PATENT DOCUMENTS

| CN | 1964294 | 5/2007 |
| CN | 1996806 | 7/2007 |

(Continued)

OTHER PUBLICATIONS

Lee, et al., "STA Group Manageent for MU-MIMO," doc.: IEEE 802.11-10/0581r0, May 2010, 13 pages.
(Continued)

*Primary Examiner* — Andrew Chriss
*Assistant Examiner* — Voster Preval
(74) *Attorney, Agent, or Firm* — Lee, Hong, Degerman, Kang & Waimey

(57) ABSTRACT

The present description relates to a method in which a station transmits data in a wireless LAN system, comprising the following steps: receiving, from an access point, control information containing station group configuration information, which indicates the configurations of station groups and uplink resource allocation information on the resource allocated to each station group; determining, on the basis of the control information, the station group to which the station belongs; and transmitting uplink data to the access point by contending with other stations in the determined station group.

10 Claims, 23 Drawing Sheets

(51) Int. Cl.
*H04W 52/02* (2009.01)
*H04W 74/08* (2009.01)
*H04W 84/12* (2009.01)
*H04W 74/00* (2009.01)

(56) References Cited

U.S. PATENT DOCUMENTS

| | | | |
|---|---|---|---|
| 2007/0147284 A1 | 6/2007 | Sammour et al. | |
| 2007/0201468 A1 | 8/2007 | Jokela | |
| 2009/0103501 A1* | 4/2009 | Farrag et al. | 370/337 |
| 2009/0296619 A1* | 12/2009 | Sammour et al. | 370/311 |
| 2011/0096710 A1* | 4/2011 | Liu et al. | 370/312 |
| 2011/0128900 A1* | 6/2011 | Seok | 370/311 |

FOREIGN PATENT DOCUMENTS

| | | |
|---|---|---|
| CN | 101288249 | 10/2008 |
| CN | 101584229 | 11/2009 |
| KR | 1020050074295 | 7/2005 |
| KR | 1020080019605 | 3/2008 |
| WO | 2009/157901 | 12/2009 |
| WO | 2010/013897 | 2/2010 |

OTHER PUBLICATIONS

Kim, et al., "GroupID Concept for Downlink MU-MIMO Transmission," doc.: IEEE 802.11-10/0073r0, Jan. 2010, 8 pages.

The State Intellectual Property Office of the People's Republic of China Application Serial No. 201180031582.4, Office Action dated Aug. 12, 2014, 14 pages.

Ting, et al., "GDCF: Grouping DCF for the MAC layer enhancement of 802.11," Global Telecommunications Conference, Globecom 2006, IEEE, XP031075817, Nov. 2006, 6 pages.

European Patent Office Application Serial No. 11786917.2, Search Report dated Mar. 23, 2015, 8 pages.

* cited by examiner

FIG. 6A

| ELEMENT ID | LENGTH | DTIM COUNT | DTIM PERIOD | BITMAP CONTROL | PARTIAL VIRTUAL BITMAP |
|---|---|---|---|---|---|
| 1 | 1 | 1 | 1 | 1 | 1-251 |

OCTETS:

FIG. 9

| 5 bits | 1 bits | 10 bits |
|---|---|---|
| N_STA | MORE PSMP INDICATOR | PSMP SEQUENCE DURATION |

FIG. 10A

| STA_INFO TYPE(=1) | PSMP-DTT START OFFSET | PSMP-DTT DURATION | PSMP GROUP ADDRESS ID |
|---|---|---|---|
| 2 | 11 | 8 | 43 |

BITS

FIG. 10B

| STA_INFO TYPE(=2) | PSMP-DTT START OFFSET | PSMP-DTT DURATION | STA_ID | PSMP-UTT START OFFSET | PSMP-UTT DURATION | RESERVED |
|---|---|---|---|---|---|---|
| BITS 2 | 11 | 8 | 16 | 11 | 10 | 6 |

FIG. 11C

| grouping information | resource information for group 1 | resource information for group 2 | . . . |

FIG. 13

| STA_INFO TYPE(=3) | PSMP-UTT START OFFSET | PSMP-UTT DURATION | PSMP GROUP ADDRESS ID |
|---|---|---|---|
| 2 | 11 | 8 | 43 |

BITS

FIG. 15A

| STA_INFO TYPE(=0) | PSMP-UTT START OFFSET | PSMP-UTT DURATION | BITMAP CONTROL (0xxx xxxx) | PARTIAL VIRTUAL BITMAP |
|---|---|---|---|---|
| 2 | 11 | 8 | 8 | VARIABLE |

BITS

FIG. 15B

| STA_INFO TYPE(=0) | PSMP-UTT START OFFSET | PSMP-UTT DURATION | BITMAP CONTROL (1xxx xxxx) | AID i | AID i | ... | AID x |
|---|---|---|---|---|---|---|---|
| 2 | 11 | 8 | 8 | | | VARIABLE | |

BITS

FIG. 16A

| STA_INFO TYPE(=3) | PSMP-UTT START OFFSET | PSMP-UTT DURATION | BITMAP CONTROL (0xxx xxxx) | PARTIAL VIRTUAL BITMAP |
|---|---|---|---|---|
| 2 | 11 | 8 | 8 | VARIABLE |

BITS

FIG. 16B

| STA_INFO TYPE(=3) | PSMP-UTT START OFFSET | PSMP-UTT DURATION | BITMAP CONTROL (1xxx xxxx) | AID i | AID i | ... | AID x |
|---|---|---|---|---|---|---|---|
| 2 | 11 | 8 | 8 | | | VARIABLE | |

BITS

METHOD AND APPARATUS FOR TRANSCEIVING DATA IN A WIRELESS LAN SYSTEM

CROSS-REFERENCE TO RELATED APPLICATIONS

This application is the National Stage filing under 35 U.S.C. 371 of International Application No. PCT/KR2011/003865, filed on May 26, 2011, which claims the benefit of U.S. Provisional Application Ser. No. 61/348,250 filed on May 26, 2010, and U.S. Provisional Application Ser. No. 61/425,206 filed on Dec. 20, 2010, the contents of which are all hereby incorporated by reference herein in their entirety.

TECHNICAL FIELD

The present invention relates to a wireless local area network (WLAN), and more particularly, to a method and apparatus for transmitting and receiving data by allocating resources to a station group.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data rate of up to 11 Mbps by using a frequency band of 2.4 GHz.

The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data rate to up to 54 Mbps by using the OFDM technology. Disadvantageously, however, the IEEE 802.11a has a shorter communication distance than the IEEE 802.11b. Similarly to the IEEE 802.11b, the IEEE 802.11g implements the data rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate.

In addition, this standard may use a coding scheme which transmits several duplicate copies to increase data reliability and also may use the OFDM to support a higher data rate.

A basic access mechanism of an IEEE 802.11 medium access control (MAC) mechanism is a carrier sense multiple access with collision avoidance (CSMA/CA) combined with binary exponential backoff. The CSMA/CA mechanism is also referred to as a distributed coordinate function (DCF) of the IEEE 802.11 MAC, and basically employs a "listen before talk" access mechanism. In this type of access mechanism, a station (STA) listens a wireless channel or medium before starting transmission. As a result of listening, if it is sensed that the medium is not in use, a listening STA starts its transmission. Otherwise, if it is sensed that the medium is in use, the STA does not start its transmission but enters a delay period determined by the binary exponential backoff algorithm.

The CSMA/CA mechanism also includes virtual carrier sensing in addition to physical carrier sensing in which the STA directly listens the medium. The virtual carrier sensing is designed to compensate for a limitation in the physical carrier sensing such as a hidden node problem. For the virtual carrier sending, the IEEE 802.11 MAC uses a network allocation vector (NAV). The NAV is a value transmitted by an STA, currently using the medium or having a right to use the medium, to another STA to indicate a remaining time before the medium returns to an available state. Therefore, a value set to the NAV corresponds to a period reserved for the use of the medium by an STA transmitting a corresponding frame.

One of procedures for setting the NAV is an exchange procedure of a request to send (RTS) frame and a clear to send (CTS) frame. The RTS frame and the CTS frame include information for reporting upcoming frame transmission to receiving STAs and thus capable of delaying frame transmission of the receiving STA.

The information may be included in a duration filed of the RTS frame and the CTS frame. After performing the exchange of the RTS frame and the CTS frame, a source STA transmits an actual frame to be transmitted to a destination STA.

FIG. 1 is a diagram showing an IEEE 802.11 MAC architecture including the aforementioned DCF.

Referring to FIG. 1, a point coordination function (PCF) and a hybrid coordination function (HCF) are provided by using a DCF service. The HCF includes an enhanced distributed channel access (EDCA) and an HCF controlled channel access (HCCA). The HCF does not exist for an STA which does not support quality of service (QoS), whereas both of the DCF and the HCF exist for an STA which support QoS. The PCF is an arbitrary function for all STAs.

Meanwhile, the IEEE 802.11n standard specifies a power-saving multi-poll (PSMP) protocol. In an operation based on the PSMP protocol, a high throughput (HT) access point (AP) allocates a downlink transmission time (DTT) and an uplink transmission time (UTT) to each HT non-AP STA (hereinafter, HT STA) associated with the HP AP or to HT STAs of a specific group, and the HT STA communicates with the HT AP only during the DTT and UTT allocated to the HT STA.

SUMMARY OF INVENTION

Technical Problem

In the conventional power-saving multi-poll (PSMP), since a resource is allocated to each station, a significantly great overhead is caused when a great number of stations are scheduled one by one, which may result in ineffective resource management.

Therefore, the present invention aims to provide a method of transmitting station grouping information and uplink resource allocation information for each station group.

In addition, the present invention aims to provide a method of transmitting station grouping information and uplink resource allocation information for a station group in a PSMP procedure method, and to newly define a contention phase for the method.

In addition, the present invention aims to provide a method of reporting to a station about identification information indicating a station group including the station by using a bitmap or an association identifier (AID).

Technical Solution

According to an embodiment of the present invention, a method for transmitting data in a wireless local area network system includes receiving control information from an access point, the control information including station group configuration information indicating a configuration of a station group and uplink resource allocation information on a resource allocated to each station group, determining a station group to which the station belongs based on the control information, and transmitting uplink data to the access point by contending with other stations in the determined station group.

The uplink resource allocation information may indicate at least one of time information and frequency information allocated for each station group.

The time information may include a start time, a duration, and an end time at which respective station in the station group transmits uplink data to the access point by contending with each other.

The control information may be transmitted by using a power-save multi-poll (PSMP) frame.

The uplink data may be transmitted to the access point by using a contention phase, and the contention phase may be located before a downlink phase, or between the downlink phase and an uplink phase, or after the uplink phase.

According to another embodiment of the present invention, a method for operating a power-save multi-poll (PSMP) in a wireless local area network system is provided. The PSMP operation includes a transmission phase, a downlink phase, an uplink phase and a contention phase, and the contention phase is a duration in which only stations in a station group including at least one station transmit uplink data to an access point by contending with other stations in the station group.

The contention phase may be located before the downlink phase, or between the downlink phase and the uplink phase, or after the uplink phase.

The PSMP frame may further include a PSMP station (STA) information (Info) Fixed field. The PSMP STA Info Fixed field may include an offset indicating a location of the contention phase, duration information and station group configuration information indicating a configuration of the station group.

The PSMP STA Info Fixed field may further include an STA Info Type field. If the STA Info Type field is set to '0' or '3', the offset, the duration information and the station group configuration information may be included in the PSMP STA Info Fixed field.

The station group configuration information may further include information indicating a station included in the station group.

The PSMP STA Info Fixed field may further include a Bitmap Control field indicating whether the station group confirmation information located after the Bitmap Control field is expressed in an association identifier (AID) corresponding to each station or is expressed in a bitmap.

According to still another embodiment of the present invention, a method for transmitting and receiving data of a station in a wireless local area network system includes receiving from an access point a power-save multi-poll (PSMP) station information fixed field including a bitmap control field indicating a format of expressing identification information indicating a PSMP group address of the station by using a PSMP frame. The format of expressing the identifier information is expressed in an association identifier (AID) corresponding to each station or is expressed in a bitmap.

The identification information indicating the PSMP group address of the station may be located after the bitmap control field.

A first bit of the bitmap control field may indicate the format of expressing the identification information.

If the identification information is expressed in the bitmap, the remaining bits other than the first bit of the bitmap control field may be expressed in an offset indicating the number of zeros included in the bitmap.

Advantageous Effects

The present invention has an advantage in that, since a resource to be used for uplink is allocated by grouping stations in a wireless local area network (WLAN) system, quality of service (QoS) is ensured while decreasing a contention level.

In addition, the present invention has an advantage in that, since an uplink resource is allocated to a station group through a power-saving multi-poll (PSMP) operation procedure, power consumption is decreased by regulating a contention level of a station.

In addition, the present invention has an advantage in that, since station group information is transmitted to a station, a station group can be dynamically changed.

DESCRIPTION OF DRAWINGS

FIG. 5 shows a block diagram for a PSMP operation applied to a PSMP procedure according to an embodiment of the present invention.

FIG. 6A shows an example of a traffic indication map (TIM) element format.

FIG. 9 shows an example of a PSMP Header field format in a PSMP frame.

FIG. 10 shows an example of a PSMP station (STA) information (Info) Fixed field format. FIG. 10A shows an example of a group-addressed PSMP STA Info Fixed field format. FIG. 10B shows an example of an individually-addressed PSMP STA Info Fixed field format.

FIG. 13 shows an example of a format of a PSMP STA Info Fixed field including information related to a contention phase according to a first embodiment of the present invention.

FIGS. 15A and 15B show an example of a PSMP STA Info Fixed field format according to a second embodiment of the present invention.

FIGS. 16A and 16B show an example of applying FIGS. 15A and 15B to a contention phase of a PSMP procedure.

MODE FOR INVENTION

Hereinafter, embodiments of the present invention will be described in detail with reference to the accompanying drawings. Among wireless network systems, a wireless local area network (WLAN) system will be taken as an example in the embodiments of the present invention described below. However, the embodiments of the present invention shall be equally applied in practice within the same or acceptable range with respect to the WLAN system within a range accepted or supported in various wireless network systems other than the WLAN system. In addition, the terms or words used in the embodiments of the present invention can be replaced with other terms or words in various wireless network systems. However, although different terms or words are used, if actual meaning is the same or similar, it is considered to be included in the scope of the present invention.

Figure 1:
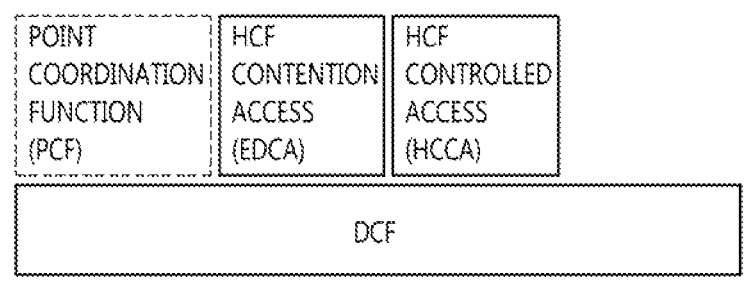
FIG. 1 is a diagram showing an institute of electrical and electronics engineers (IEEE) 802.11 medium access control (MAC) architecture including a distributed coordinate function (DCF).
Figure 2:
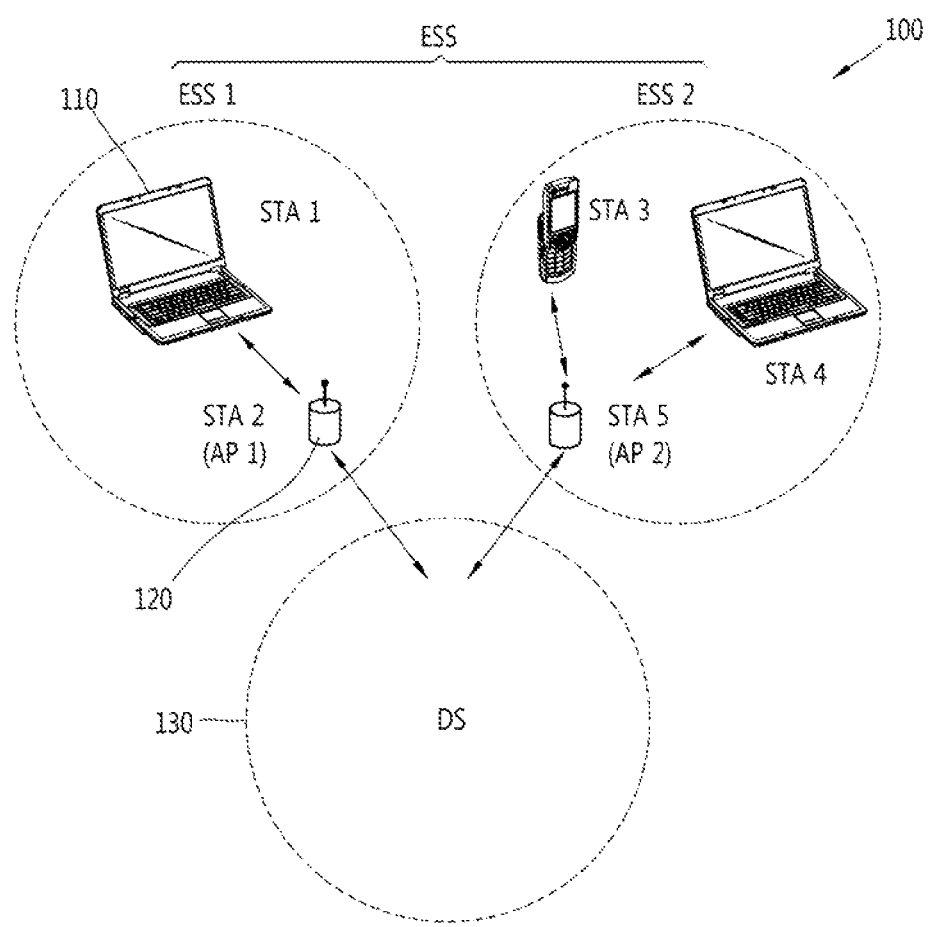
FIG. 2 is a schematic view showing an exemplary structure of a very high throughput (VHT) wireless local area network (WLAN) system according to an embodiment of the present invention.

FIG. 2 is a schematic view showing an exemplary structure of a VHT WLAN system according to an embodiment of the present invention.

Referring to FIG. 2, a WLAN system such as the VHT WLAN system includes one or more basis service sets (BSSs). The BSS is a set of stations (STAs) which are successfully synchronized to communicate with one another, and is not a concept indicating a specific region. The WLAN system to which the embodiment of the present invention is applicable is a very high throughput (VHT) WLAN system that supports a super high-speed data processing of 1 GHz or higher in a medium access control (MAC) service AP (SAP). A BSS in the VHT system is referred to as a VHT BSS.

The VHT system including one or more VHT BSSs can use a channel bandwidth of 80 MHz, but this is for exemplary purposes only. For example, the VHT system can also use a bandwidth of 60 MHz, 100 MHz, or higher. As such, the VHT system has a multi-channel environment including a plurality of subchannels with a channel bandwidth of 20 MHz, for example.

The BSS can be classified into an infrastructure BSS and an independent BSS (IBSS). The infrastructure BSS is shown in FIG. 2. Infrastructure BSSs (i.e., BSS1 and BSS2) include one or more STAs (i.e., STA1, STA3, and STA4), an access point (AP) which is an STA providing a distribution service, and a distribution system (DS) connecting the plurality of APs (i.e., AP1 and AP2). On the other hand, since the IBSS does not include the AP, all STAs consist of mobile STAs, and a self-contained network is configured since connection to the DS is not allowed.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense. In the VHT WLAN system to which the embodiment of the present invention is applicable, STAs included in the BSS may be all VHT STAs, or a VHT STA and a legacy STA (i.e., IEEE 802.11n-based HT STA) may coexist.

Among the STAs, non-AP STAs (i.e., STA1, STA3, STA4, STAG, STAT, and STAB) are portable terminals operated by users. A non-AP STA may be simply referred to as an STA. The non-AP STA may also be referred to as a terminal, a wireless transmit/receive unit (WTRU), a user equipment (UE), a mobile station (MS), a mobile terminal, a mobile subscriber unit, etc.

The AP (i.e., AP1 and AP2) is a functional entity for providing connection to the DS through a wireless medium for an STA associated with the AP. Although communication between non-AP STAs in an infrastructure BSS including the AP is performed via the AP in principle, the non-AP STAs can perform direct communication when a direct link is established.

In addition to the terminology of an AP, the AP may also be referred to as a centralized controller, a base station (BS), a node-B, a base transceiver system (BTS), a site controller, etc.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical construction for interconnecting APs.

Although the WLAN system is described with reference to FIG. 2, a wireless network system including the WLAN system according to an embodiment of the present invention is not limited thereto, and thus can be implemented by combining these systems or can be implemented as a totally different system.

In addition, although the wireless network system according to the embodiment of the present invention can exist alone, it may interwork with another network system, a mobile communication network, and a wired/wireless Internet network. For example, the WLAM system may interwork with the mobile communication system to provide a roaming service. More specifically, when the WLAN system provides a voice service, a dual band dual mode (DBDM) terminal which supports both WLAN and WCDMA can seamlessly provide automatic roaming by using the WLAN system in a region where the WLAN system is supported, while using voice telephony through the mobile communication network.

Figure 3:
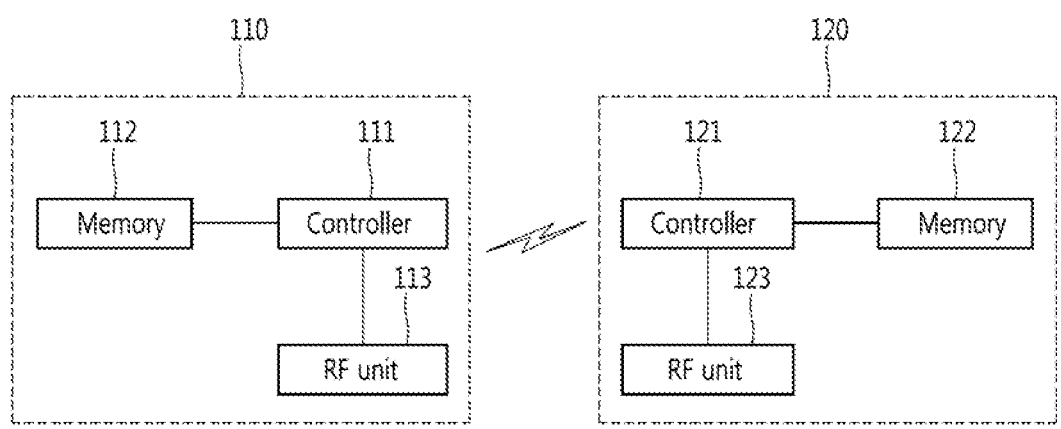
FIG. 3 is a block diagram showing a station 110 and an access point 120 according to an embodiment of the present invention.

FIG. 3 is a block diagram showing a station (STA) 110 and an access point (AP) 120 according to an embodiment of the present invention.

The STA 110 includes a controller 111, a memory 112, and a radio frequency (RF) unit 113.

Although not shown, the STA also includes a display unit, a user interface unit, etc.

The controller 111 implements the proposed functions, procedures, and/or methods. Layers of a wireless interface protocol can be implemented by the controller 111.

The memory 112 is coupled to the controller 111, and stores a parameter or protocol for performing wireless communication. That is, the memory 112 stores an operating system of a terminal, an application, and a general file.

The RF unit 113 is coupled to the controller 111, and transmits and/or receives an RF signal.

In addition, the display unit displays a variety of information of the terminal, and may use well-known elements such as a liquid crystal display (LCD), an organic light emitting diode (OLED), etc. The user interface unit may be constructed by combining well-known user interfaces such as a keypad, a touch screen, or the like.

The AP 120 includes a controller 121, a memory 122, and an RF unit 123.

The controller 121 implements the proposed functions, procedures, and/or methods. Layers of a wireless interface protocol can be implemented by the controller 121.

The memory 122 is coupled to the controller 121, and stores a parameter or protocol for performing wireless communication.

The RF unit 123 is coupled to the controller 121, and transmits and/or receives an RF signal.

The controllers 111 and 121 may include an application-specific integrated circuit (ASIC), a separate chipset, a logic circuit, and/or a data processing unit. The memories 112 and 122 may include a read-only memory (ROM), a random access memory (RAM), a flash memory, a memory card, a storage medium, and/or other equivalent storage devices. The RF units 113 and 123 may include a baseband circuit for processing an RF signal. When the embodiment of the present invention is implemented in software, the aforementioned methods can be implemented with a module (i.e., process, function, etc.) for performing the aforementioned functions. The module may be stored in the memories 112 and 122 and may be performed by the controllers 111 and 121.

The memories 112 and 122 may be located inside or outside the controllers 111 and 121, and may be coupled to the controllers 111 and 121 by using various well-known means.

Connection Procedure

Figure 4:
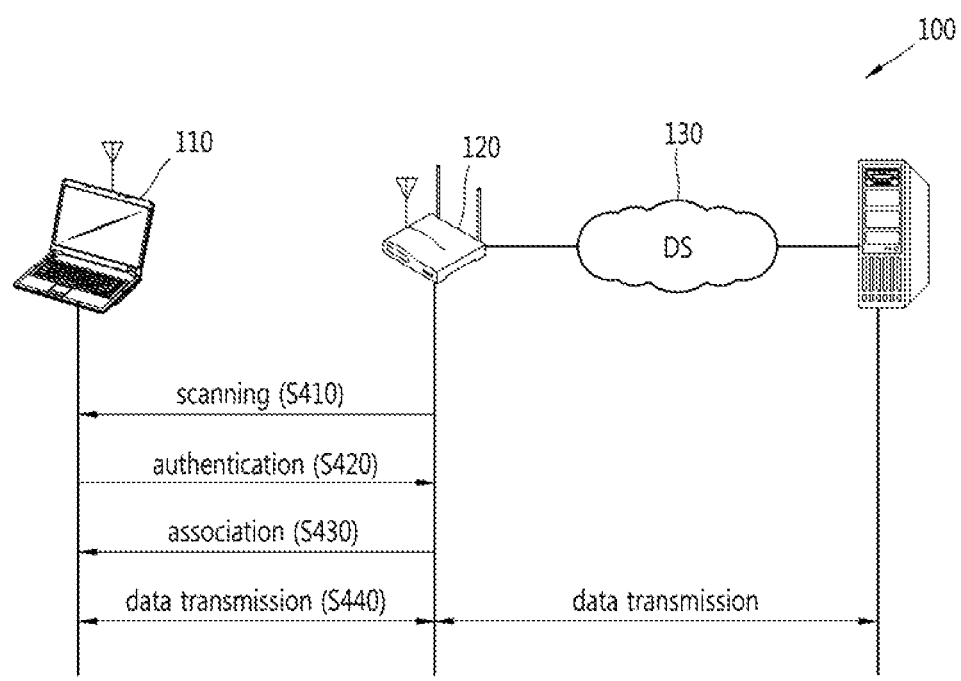
FIG. 4 is a flowchart showing a connection procedure for data transmission in a WLAN system of FIG. 2.

FIG. 4 is a flowchart showing a connection procedure for data transmission in the WLAN system of FIG. 2.

Referring to FIG. 4, a connection procedure for data transmission between an STA 110 and an AP 120 in a WLAN system 100 includes scanning S410, authentication S420, and association S430. The STA 110 and the AP 120 perform data transmission S440 via the aforementioned operations S410, S420, and S430.

The scanning S410 is an operation of searching for a neighboring AP 120 by using a beacon or probe message.

The scanning S410 includes passive scanning for searching for the AP 120 from a beacon message periodically transmitted by the AP 120 and active scanning for selecting the AP 120 by transmitting a probe request of the STA 110 and then receiving a probe response containing its service set ID (SSID), an operation speed, etc., from the AP 120. The beacon message contains several capabilities (i.e., speed, encryption, etc.) that can be supported by the AP 120 and an SSID which is a name of a service group to which the AP belongs.

The authentication S420 is an operation in which the STA 110 which selects the proper AP 120 through the scanning S410 proves to the AP 120 that the STA 110 is a valid STA. That is, the authentication S420 is an operation for negotiating an authentication procedure and an encryption scheme with the AP 120. Since an open system authentication scheme is used in most cases, the AP 120 unconditionally authenticates upon receiving an authentication request from the STA. Examples of further enforced authentication include IEEE 802.1x-based EAP-TLS, EAP-TTLS, EAP-FAST, PEAP, etc.

The association S430 is an operation in which the STA 110 accesses to the AP 120 after the authentication is successful. The association S430 implies that an identifiable connection is established between the STA 110 and the AP 120. When the association S430 is finished, the STA 110 can communicate with another STA via the AP 120.

The association S430 is performed in such a manner that, when the STA 110 transmits an association request to the AP 120, the AP 120 transmits an association response containing an association ID (AID) for identifying the STA from another STA.

The STA 110 and the AP 120 perform data transmission S440 through the aforementioned operations S410, S420, and S430.

Reassociation is similar to the association S430. The reassociation is an operation in which the STA 110 is associated with another AP different from the associated AP 120. The reassociation is an operation of establishing a new connection with another new AP when a signal from the AP 120 associated with the STA 110 becomes weak.

Figure 5:
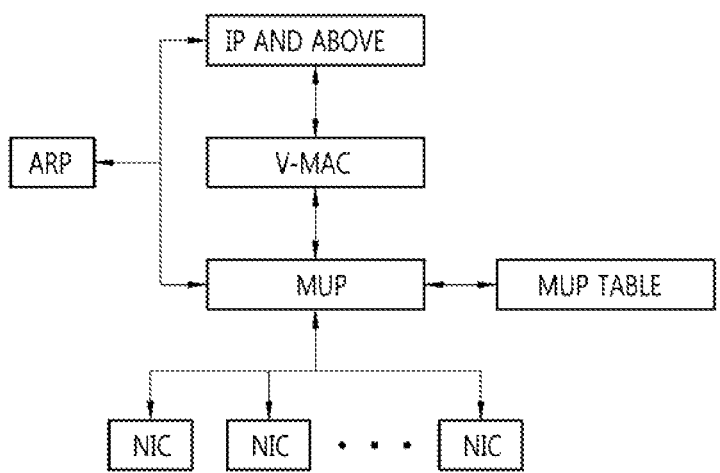
FIG. 5 is a block diagram for a multi-radio unification protocol (MUP) as an example of a protocol applicable to a very high throughput (VHT) system having a plurality of network interface cards (NICs) each of which has an independent radio interface.

FIG. 5 is a block diagram for a multi-radio unification protocol (MUP) as an example of a protocol applicable to a very high throughput (VHT) system having a plurality of network interface cards (NICs) each of which has an independent radio interface.

Referring to FIG. 5, a VHT STA supporting the MUP includes a plurality of NICs. In FIG. 5, the respective NICs are separately illustrated, which means that a MAC/PHY module is independently operated in each NIC. That is, the NICs of FIG. 5 are separately illustrated to indicate that the NIC is a logical entity which operates depending on an individual MAC/PHY protocol. Therefore, it is possible to implement the plurality of NICs as functional entities which are physically identified from each other or as one integral physical entity.

According to one aspect of the present embodiment, the plurality of NICs can be divided into a primary radio interface and one or more secondary radio interfaces. If the secondary radio interface is plural in number, it can also be divided into a $1^{st}$ secondary radio interface, a $2^{nd}$ secondary radio interface, a $3^{rd}$ secondary radio interface, etc. The division of the primary radio interface and the secondary radio interface and/or the division of the secondary radio interface itself may be based on policy or may be determined adaptively by considering a channel environment.

The plurality of NICs are integrally managed by using the MUP. As a result, from the perspective of an external element, the plurality of NICs are recognized as if they are one entity. For such an operation, the VHT system includes a virtual medium access control (V-MAC). When using the V-MAC, an upper layer does not recognize that a multi-radio channel is operated by the plurality of NICs. As such, in the VHT system, the upper layer does not recognize the multi-radio by the use of the V-MAC. That is, one virtual Ethernet address is provided.

Power-Saving Mode

In a power-saving mode (PSM) of the WLAN system 100, the STA 110 periodically repeats a sleep state and an active state to reduce power consumption. The PSM is a mode in which, when the STA does not transmit data or when there is no frame to be delivered to the STA, in order to save power, the STA 110 temporarily stops an operation of a transceiver of which power consumption is great.

In the PSM, each STA 110 operates in any one of the two states, i.e., the sleep state and the active state, and transmits data by transitioning from the sleep state to the active state whenever there is data to be transmitted by the STA.

In addition, the AP 120 which always powers on must be able to transmit a packet to the STA 110 in the sleep state. For this, all STAs 110 in the sleep mode must wake up at the same time to determine whether there is a packet to be transmitted by the AP 120 to the STAs 110, and if the packet exists, must request transmission thereof. Herein, all of the STAs 110 can wake up at the same time because the STAs use a clock common to the AP 120.

Each STA 110 specifies a listen interval which is a multiple of a beacon transmission period to an association request message when it is initially associated with the AP 120, and if the STA enters the sleep mode, notifies a wake-up period to the AP 120.

During at least this period, the AP 120 must buffer frames to be relayed to the STA 110. Even if such an operation is not performed in an initial stage, since each STA 110 enters the sleep mode when necessary, if there is a frame to be transmitted to the STA, the STA can transmit to the AP 120 a null data frame in which a power management field is set to '1, and upon receiving ACK thereof from the AP 120, can enter the sleep mode. Thereafter, the STA 110 temporarily wakes up around a time at which a beacon is received, and waits for a beacon message transmitted by the AP 120.

For the STAs 110 in the sleep mode, the AP 120 buffers frames to be transmitted to the STAs 110. The AP 120 transmits a traffic indication map (TIM) element for enumerating a list of the STAs 110 which must have the buffered frames, by carrying the TIM element on the beacon message. That is, by using the TIM element of the beacon, the AP reports to each STA about whether there is a frame to be received.

If a frame to be received by the STA is buffered in the AP 120, the STA 110 remains in the active state. Further, the STA 110 transmits a PS-Poll frame to the AP 120, and thus requests the AP 120 to transmit the buffered frames. If the frame to be transmitted by the STA is not buffered in the AP 120, the STA 110 enters the sleep state.

The TIM element is roughly classified into two types, i.e., TIM and delivery TIM (DTIM). The TIM is used to indicate a unicast frame. The DTIM is used to indicate a multicast/broadcast frame.

FIG. 6A shows an example of a TIM element format.

As shown in FIG. 6A, the TIM element format includes an Element ID field, a Length field, a DTIM Count field, a DTIM Period field, a Bitmap Control field, and a Partial Virtual Bitmap field.

First, the Element ID field is a field which indicates that this information element is a TIM element. The Length field is a field which indicates a total length of its subsequent fields (i.e., DTIM Count, DTIM Period, Bitmap Control, Partial Virtual Bitmap) including the Length field itself. A maximum value of the Length field is 255, and unit is octet (i.e., 1 byte). The DTIM Count field indicates whether a current TIM element is DTIM, and if not, indicates the number of the remaining upcoming TIMs. The DTIM Period field indicates how many TIM transmission periods are used to transmit the DTIM. In the bitmap control field, a $1^{st}$ bit is used to indicate a case where a multicast/broadcast frame exists. The remaining 7 bits are used to indicate an offset in a subsequent bitmap.

In the Partial Virtual Bitmap field, whether there is a frame to be transmitted to each STA is indicated in a bitmap format. Since 1 to 2007 are allocated in that order according to the order of AID, if a $4^{th}$ bit is set to '1', it means that a frame to be sent to an STA whose AID is 4 is buffered in an AP.

Figure 6B:
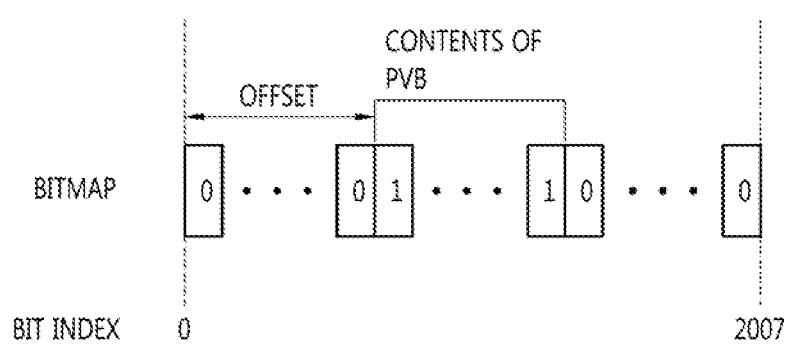
FIG. 6B shows an example of a partial virtual bitmap.

FIG. 6B shows an example of a partial virtual bitmap.

In a case where many bits are contiguously set to '0' in a bitmap, it is not efficient to use the entire bitmap. An offset is used in the 802.11 standard to solve this problem. If '0' continuously appears from the beginning, these zeros are all omitted, and the bitmap is not marked until '1' first appears. In this case, a length of duration in which the '0' continuously appears is determined to an offset value, and is stored in the Bitmap Control field. In a case where '0' continuously appears in the last portion, zeros are also omitted in the bitmap.

Power-Saving Multi-Poll (PSMP)

Hereinafter, a PSMP procedure in a VHT WLAN system will be described.

Figure 7:
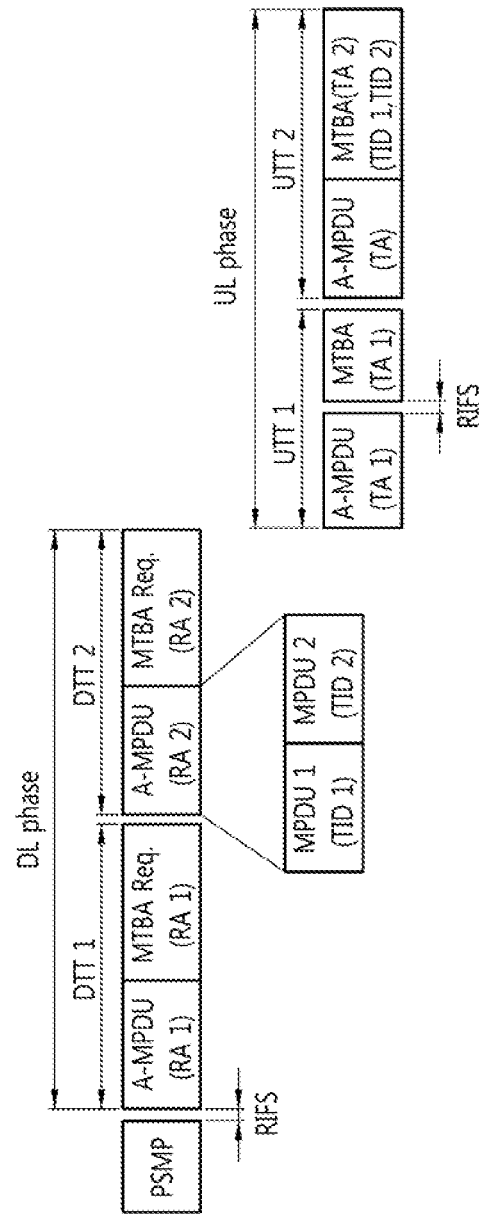
FIG. 7 is a diagram showing an example of a power-saving multi-poll (PSMP) operation to which a PSMP procedure is applicable in a VHT WLAN system.

FIG. 7 is a diagram showing an example of a PSMP operation to which a PSMP procedure is applicable in a VHT WLAN system.

As shown in FIG. 7, the PSMP operation includes a PSMP frame transmission phase, a downlink (DL) phase, and an uplink (UL) phase. The PSMP operation can be expressed in a PSMP sequence. The PSMP sequence is a sequence of frames of which a first frame is a PSMP frame and which include frames transmitted in zero or more PSMP-downlink transmission times (DTTs) subsequent to the PSMP frame or frames transmitted in zero or more PSMP-uplink transmission times (UTTs).

Referring to FIG. 7, in a $1^{st}$ phase (i.e., PSMP frame transmission phase) of the PSMP operation, a VHT AP multicasts/broadcasts the PSMP frame. That is, a $1^{st}$ frame of the PSMP sequence is the PSMP frame, and a destination address (DA) or a receiving address (RA) of this PSMP frame is a specific group address. The PSMP frame is an action frame transmitted by the VHT AP to STAs of a specific group, and may include information on a DTT in a DL phase and information on a UTT in a UL phase, that is, information indicating to which STAs the DTT is allocated and to which STAs the UTT is allocated. Taking a case of the PSMP sequence of FIG. 7 for example, the PSMP frame includes information indicating that DTT1 and DTT2 are respectively allocated to STA1 and STA2, and UTT1 and UTT2 are respectively allocated to the STA1 and the STA2. Also in this case, RA1 and TA1 of FIG. 7 are for the STA1, and RA2 and TA2 of FIG. 7 are for the STA2.

At the end of the PSMP frame transmission phase, the DL phase starts after a specific inter-frame gap (e.g., reduced interframe spacing (RIFS)) elapses. In the DL phase, i.e., DTT, the STA1 transitions to an active state in the DTT1 and receives a multi-TID block ACK request frame (MTBA Req.) and an A-MAC protocol data unit (MPDU) transmitted from the VHT AP. Then, the STA1 can enter a doze state.

Subsequently, the STA2 transitions to the active state in the DTT2 and receives the MTBA Req. and A-MPDU (i.e., MPDU1(TID1) and MPDU2(TID2)) transmitted from the VHT AP. Then, the STA2 can return to the doze state.

Subsequently, after the DL phase ends, the UL phase starts. In the UL phase, i.e., UTT, the STA1 transitions to the active state in the UTT1 and transmits an A-MPDU and an MTBA to the VHT AP. A specific RIFS may exist between the A-MPDU and the MTBA. Then, the STA1 can return to the doze state. Subsequently, the STA2 transitions to the active state in the UTT2 and transmits an A-MPDU and an MTBA to the VHT AP. In this case, the MTBA may be transmitted by being integrated to a related A-MPDU instead of being transmitted at additional timing. Then, the STA2 can return to the doze state.

Figure 8:
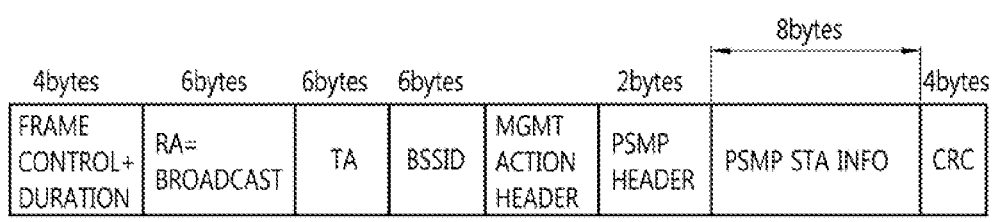
FIG. 8 is a diagram showing some elements included in a PSMP frame that can be used in a PSMP procedure of a VHT WLAN system.

FIG. 8 is a diagram showing some elements included in a PSMP frame that can be used in a PSMP procedure of a VHT WLAN system.

Referring to FIG. 8, the PSMP frame includes a Frame Control+Duration field, an RA field, a TA field, a BSSID field, a Mgmt Action Header field, a PSMP Header (or PSMP Parameter Set Fixed) field, a PSMP STA Info field, and a CRC field.

The Frame Control+Duration field includes a management action frame used in WLAN, e.g., duration information for setting a network allocation vector (NAV) to a neighboring STA together with a variety of information necessary to control a VHT related management action frame. Examples of the information for frame control include a protocol version, a type and a subtype, To DS, From DS, power management, etc., which are for exemplary purposes only.

Herein, the type of PSMP frame may be a management frame, and its subtype may be an action frame.

The RA field is for specifying a receiving STA of the PSMP frame. In case of the PSMP frame, the RA or the DA may be specified to a specific group address or may be set to a broadcast address. The TA field may be set to an address of a VHT AP which transmits the PSMP frame. The BSSID field is set to a value indicating an identifier of a BSS managed by the VHT AP which transmits the PSMP frame.

The Mgmt Action Header field may include information other than the aforementioned information included in a header part of the Management Action Field, and is also called a PSMP Parameter Set field. The Management Action Header field defines the number of PSMP STA Info fields included in the PSMP frame, and is used to indicate whether it is followed by an additional PSMP frame and to indicate a duration of the PSMP.

In addition, there are two types of PSMP STA Info Fixed field. That is, there are a group-addressed PSMP STA Info Fixed field used when allocating a time for multicast frame transmission only in a DL phase and an individually-addressed PSMP STA Info Fixed field for allocating a time for unicast frame transmission in DL and UL phases.

The PSMP STA Info Fixed field includes subfields, i.e., STA_INFO Type, DTT/UTT Start Offset, DTT/UTT Duration, and STA ID (or PSMP Group Address ID).

The STA_INFO Type is used to indicate whether the PSMP STA Info field corresponds to individually addressed case or a group-addressed case. For example, if the STA_INFO Type is set to '1', the PSMP STA Info field may have a format of the group-addressed case. If the STA_INFO Type is set to '2', the PSMP STA Info field may have a format of the individually-addressed case.

The DTT/UTT Start Offset is used to indicate the start of PSMP-DTT/UTT relative to the end of the PSMP frame with respect to a destination identified by the PSMP STA Info field. This subfield indicates a start time of a $1^{st}$ PPDU including DL/UL data for the destination. The DTT/UTT Duration indicates a duration of the PSMP-DTT/UTT for a destination identified by the PSMP STA Info field. This subfield indicates an end time of a last PPDU including DL/UL data for the destination, and is a value relative to a value which is set in the PSMP-DTT/UTT Start Offset. The STA ID includes an AID of an STA to which the PSMP STA Info field is destined.

FIG. 9 shows an example of a PSMP Header field format in a PSMP frame.

Referring to FIG. 9, the PSMP Header field (or a PSMP Parameter Set Fixed field) includes subfields, i.e., N_STA for indicating the number of PSMP STA Info fields which exist in the PSMP frame including the PSMP Header field, More PSMP Indicator for indicating whether the PSMP frame is followed by another PSMP frame, and PSMP Sequence Duration for indicating a duration of the PSMP frame.

FIG. 10 shows an example of a PSMP STA Info Fixed field format. FIG. 10A shows an example of a group-addressed PSMP STA Info Fixed field format. FIG. 10B shows an example of an individually-addressed PSMP STA Info Fixed field format.

As shown in FIG. 10A, PSMP STA_INFO Type has a value '1' in a group-addressed case. PSMP-DTT Start Offset indicates an offset of a DL allocation time after PSMP frame transmission. PSMP-DTT Duration indicates an interval of the DL allocation time. PSMP Group Address ID indicates an address of STAs for receiving a multicast frame. Upper 43 bits of a 48-bit MAC address indicate STAs for receiving this field.

As shown in FIG. 10B, PSMP STA_INFO Type has a value '2'. PSMP-DTT Start Offset and PSMP-DTT Duration indicate an offset and duration of a time allocated for DL. STA_ID is an association identifier (AID) of a corresponding STA. PSMP-UTT Start Offset and PSMP-UTT Duration indicate an offset and duration of a time allocated for UL.

Hereinafter, a method is described in which an access point (AP) allocates a resource to a specific station group including at least one STA in a WLAN system, so that STAs in the specific station group transmit UL data to the AP by contending with each other.

Figure 11A:
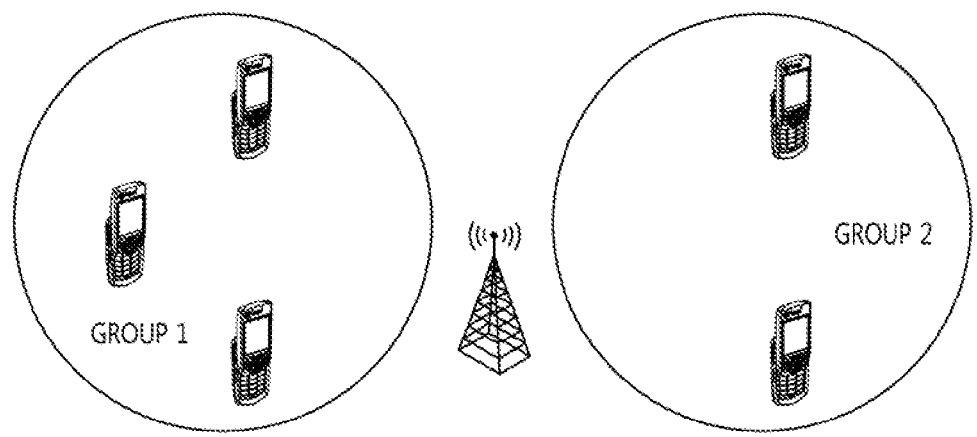
FIG. 11A shows an example of a WLAN system model including at least one station group according to an embodiment of the present invention.

FIG. 11A shows an example of a WLAN system model including at least one station group according to an embodiment of the present invention.

As shown in FIG. 11A, 5 STAs are included in a group 1 and a group 2. That is, the group 1 includes 4 STAs, and the group 2 includes 2 STAs.

Figure 11B:
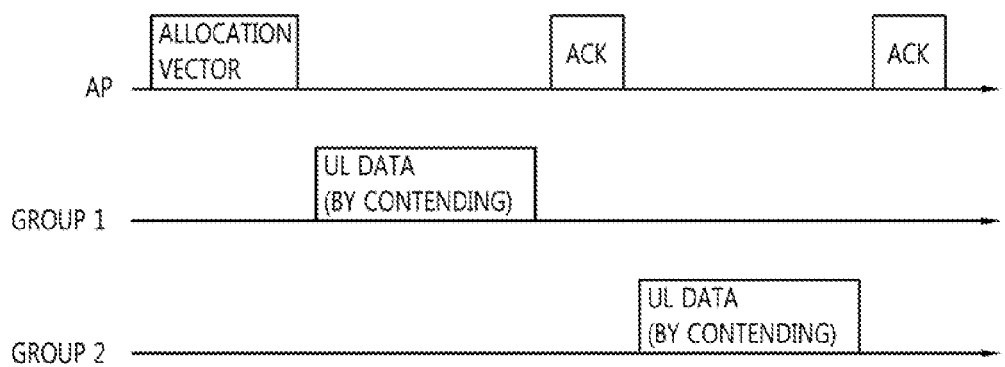
FIG. 11B shows an example of transmitting uplink data by allocating an uplink resource to each station group on the basis of FIG. 11A.

FIG. 11B shows an example of transmitting UL data by allocating a UL resource to each station group on the basis of FIG. 11A.

First, an AP performs grouping on STAs within a coverage to which the AP belongs according to a specific rule so that at least one STA is included. Herein, the specific rule may be a location of STAs, a MAC address, a power amount, a class of a terminal, a service usage situation, etc., and is not restricted as long as the STAs can be grouped.

Thereafter, the AP broadcasts and/or multicasts, to the STA, station group configuration information indicating a configuration of the station group and control information including DL or UL resource allocation information allocated for each station group. That is, by transmitting the station grouping information to the STAs, the AP can know to which station group the STA belongs. Herein, the control information can also be expressed in an allocation vector.

Herein, the AP can transmit a group ID of each station group and a station ID in the group to the STA as the station group configuration information.

In addition, the UL resource allocation information indicates at least one of time information and frequency information allocated for each station group. Herein, in case of a WLAN system (e.g., IEEE 802.11 system), the UL resource allocation information may be time information, and in case of a cellular system, the UL resource allocation information may be time information and frequency information.

The time information includes a start time, transmission duration, and end time at which the respective STAs in the station group transmit data to the AP by contending to each other.

Thereafter, the STA determines to which station group the STA belongs by using the control information received from the AP, and thereafter transmits data to the AP by using a resource allocated to the station group. In this case, in UL data transmission, the STA transmits UL data to the AP by contending with other STAs in the determined station group.

FIG. 11C shows an example of a control information (or allocation vector) format according to an embodiment of the present invention.

As shown in FIG. 11C, the control information format includes station grouping information and resource information allocated to each station group.

First Embodiment

Hereinafter, a method of transmitting UL data by an STA in a station group in a PSMP procedure by using station grouping information and UL resource allocation information allocated to each station group will be described according to a first embodiment of the present invention.

FIGS. 12A to C show a PSMP procedure according to a first embodiment of the present invention.

As shown in FIGS. 12A to 12C, a PSMP operation procedure in a WLAN system includes a PSMP frame transmission phase, a DL phase, a UL phase, and a contention phase. That is, by newly defining the contention phase, the contention phase allows only STAs in a station group including at least one STA to transmit data to an AP by contending with other STAs in the station group. In this case, there is an advantage in that a possible collision can be mitigated when the WLAN system has many STAs and all of the STAs participate in contention.

Figure 12:
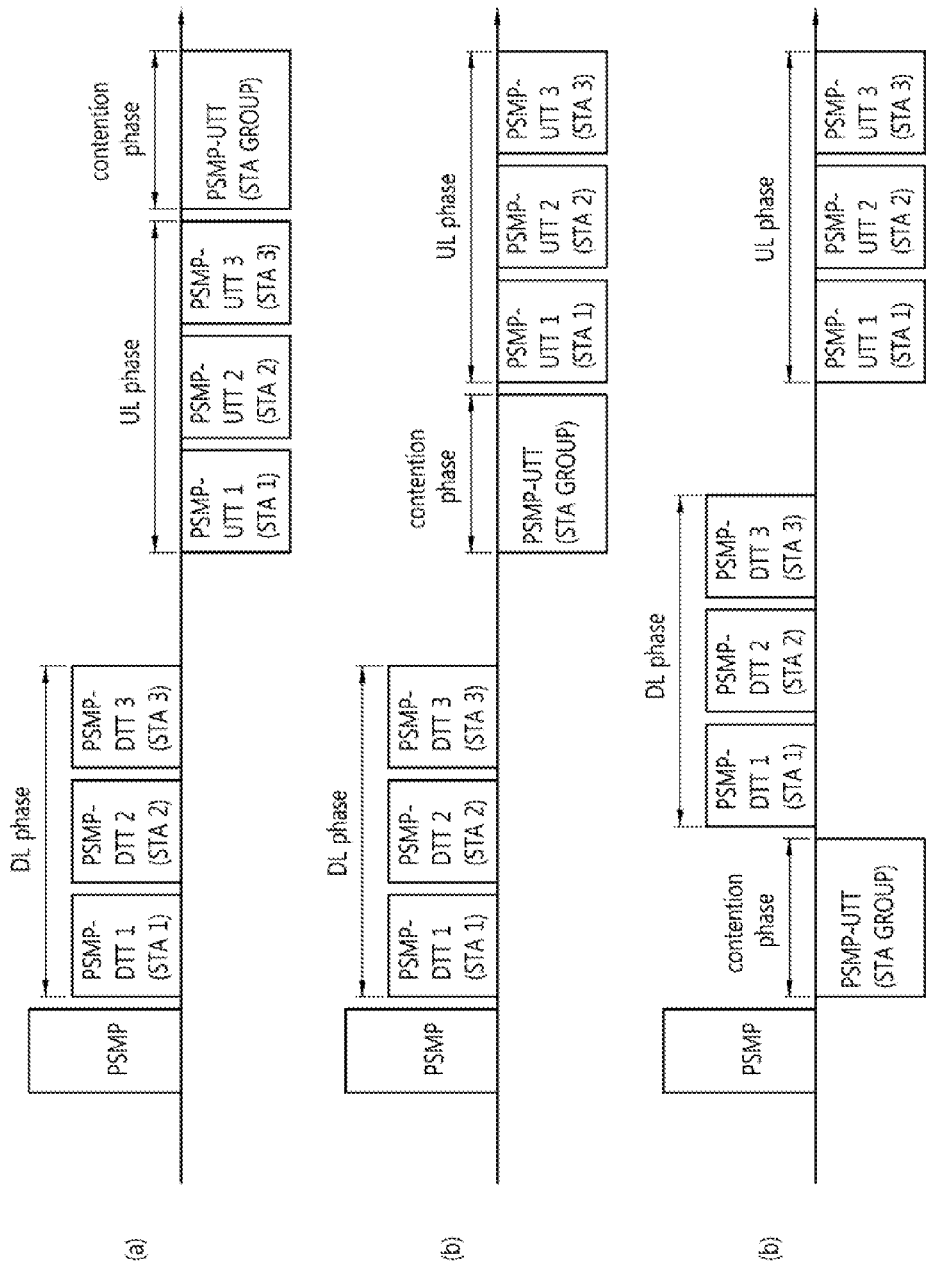
FIGS. 12A to 12C show a PSMP procedure according to a first embodiment of the present invention.

Herein, the contention phase may be located before the DL phase (see FIG. 12A), or between the DL phase and the UL phase (see FIG. 12B), or after the UL phase (see FIG. 12).

The AP broadcasts and/or multicasts, to the STA, station group configuration information and UL resource allocation information allocated for each STA.

In addition, information related to the contention phase, that is, information on an offset, duration, and station group indicating a location of the contention phase can be transmitted by using a PSMP frame, in particular, a PSMP STA Info Fixed field in the PSMP frame.

In this case, if STA Info Type included in the PSMP STA Info Fixed field is set to a value '0' or '3', the information related to the contention phase is defined.

FIG. 13 shows an example of a format of a PSMP STA Info Fixed field including information related to a contention phase according to a first embodiment of the present invention.

As shown in FIG. 13, if STA Info Type is set to '3', it indicates that the PSMP STA Info Fixed field includes information regarding the contention phase. That is, PSMP-UTT Start Offset indicates an offset at which the contention phase starts, and PSMP-UTT Duration indicates a duration of the contention phase. In addition, PSMP Group Address ID indicates a station group included in the contention phase. Herein, similarly to a DL multicast case, the PSMP group address ID can be used as a group address of up to 32 STAs of which upper 43 bits of a MAC address are identical.

Figure 14A:
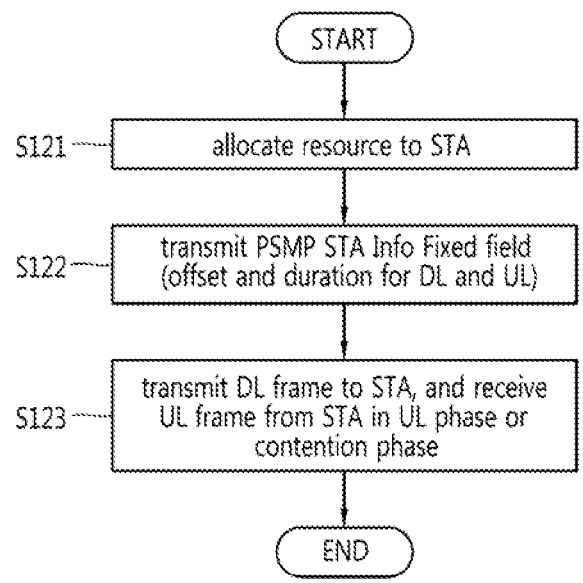
FIGS. 14A and 14B are flowcharts showing an operation of an access point and a station according to a first embodiment of the present invention.
Figure 14B:
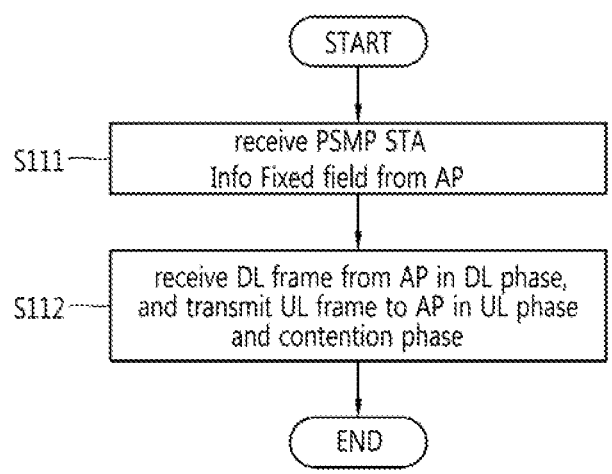

FIGS. 14A and 14B are flowcharts showing an operation of an AP and an STA according to a first embodiment of the present invention.

FIG. 14A shows a method of operating an AP, and FIG. 14B shows a method of operating an STA.

Referring to FIG. 14A, the AP allocates a resource (i.e., time) to STAs (or a specific STA) according to a determined scheduler (step S121). Herein, the AP can allocate a UL resource to a specific station group.

Thereafter, the AP reports to the STAs about an offset and duration for DL and UL by using a PSMP STA Info Fixed field included in a PSMP frame (step S122).

Thereafter, the AP transmits a DL frame to the STAs in a DL phase, and receives a UL frame from the STA in a UL phase and a contention phase (step S123).

Referring to FIG. 14B, the STA acquires information regarding a resource (i.e., time) allocated to the STA, by receiving the PSMP STA Info Fixed field included in the PSMP frame from the AP (step S111).

Thereafter, in the DL phase, the STA wakes up at a determined offset, and receives the DL frame from the AP during a specific duration (step S112).

Then, in the UL phase, the STA wakes up in a determined offset, and transmits a UL frame to the AP during a determined duration. Then, in a case where the STA is included in a station group of a contention phase, if the contention phase starts, the STA transmits UL data to the AP by contending with other STAs (step S112).

Second Embodiment

The conventional PSMP Group Address ID has a disadvantage in that a group address of an STA cannot be dynamically changed since a MAC address is used, and is not effective in terms of network management because STAs of which upper bits of the MAC address are different cannot be grouped.

That is, as one embodiment of the present invention, the second embodiment newly provides a way of expressing a PSMP Group Address ID included in a group-addressed PSMP STA Info Fixed field.

FIGS. 15A and 15B show an example of a PSMP STA Info Fixed field format according to a second embodiment of the present invention.

The PSMP STA Info Fixed field includes an STA Info Type field, a PSMP-DTT Start Offset field, a PSMP-DTT Duration field, a Bitmap Control field, and a Partial Virtual Bitmap field or at least one AID.

As shown in FIGS. 15A and 15B, STA_INFO Type of the PSMP STA Info Fixed field is set to '0' since it is a group-addressed PSMP STA Info Fixed field.

The Bitmap Control field is a field indicating whether an AID corresponding to each STA is used or a bitmap is used after the Bitmap Control field as identification information indicating a PSMP group address of STAs. That is, a $1^{st}$ field of the Bitmap Control field is used to determine whether identification information indicating the PSMP group address is used in a bitmap format or whether an AID of the STA is directly indicated.

In addition, the remaining 7 bits of the Bitmap Control field are used as a bitmap offset when the field is followed by a bitmap (that is, when a $1^{st}$ bit of the Bitmap Control field is set to '0'), and are reserved when the field is directly followed by the AID (that is, when the $1^{st}$ bit of the Bitmap Control field is set to '1').

As shown in FIG. 15A, if the $1^{st}$ bit of the Bitmap Control field is set to '0', the Bitmap Control field is followed by the PSMP group address ID of the STA, which is expressed in a bitmap format. Herein, the Partial Virtual Bitmap of FIG. 15A can be configured by using a method of configuring the Partial Virtual Bitmap in the TIM element described above.

As an example of expressing the bitmap, when 6 STAs (i.e., STA 1, STA 2, STA 3, STA 4, STA 5, and STA 6) exist in a WLAN system and the STA 1, the STA 3, and the STA 5 constitute one station group, an AP transmits the Partial Virtual Bitmap of the PSMP STA Info Fixed field by setting the Partial Virtual bitmap to '10101'. In this case, by using the Partial Virtual Bitmap ('10101') transmitted from the AP, the STAs can know that they belong to a station group.

In addition, the aforementioned example may also use a method of configuring the Partial Virtual Bitmap of the TIM element. That is, when the STA 5 and the STA 6 construct one station group, the AP can indicate an offset of '0000' (to indicate STAs 1 to 4) by using the remaining 7 bits other than the $1^{st}$ bit in the PSMP STA Info Fixed field, and can transmit the Partial Virtual Bitmap by setting it to '11'.

Further, as shown in FIG. 15B, if the $1^{st}$ bit of the Bitmap Control field is set to '1', the Bitmap Control field is directly followed by an AID of STAs which belong to a station group.

FIGS. 16A and 16B show an example of applying FIGS. 15A and 15B to a contention phase of a PSMP procedure.

As illustrated, FIGS. 16A and 16B are the same as FIGS. 15A and 15B except for a case where a value of an STA Info Type field is set to '3'.

What is claimed is:

1. A method for transmitting data in a wireless local area network system, performed by a station, the method comprising:

receiving control information from an access point, the control information including station group configuration information and time information, wherein the time information includes a start time and a duration for a contention phase, and wherein the station group configuration information includes information about a plurality of association identifiers (AIDs) used to identify a group of stations that are only allowed to access the contention phase indicated by the time information;

determining whether the station belongs to the group of stations indicated by the station group configuration information; and performing a contention with other stations in the group of stations during the contention phase when the station determines that the station belongs to the group of stations.

2. The method of claim 1, wherein the control information is received in a power-save multi-poll (PSMP) frame.

3. The method of claim 2, wherein the control information in the PSMP frame further includes information for a downlink phase and an uplink phase.

4. The method of claim 1, wherein the station determines that the station belongs to the group of stations if the station's AID matches with one of the plurality of AIDs indicated by the station group configuration information.

5. The method of claim 1, wherein the control information further includes frequency information indicating a frequency allocated to the group of stations.

6. The method of claim 1, wherein the contention is performed during the contention phase in order to transmit uplink data.

7. A station for transmitting data in a wireless local area network system, the station comprising:

a radio frequency (RF) unit configured to transmit and receive radio signals; and a processor operatively coupled with the RF unit and configured to:

receive, via the RF unit, control information from an access point, the control information including station group configuration information and time information, wherein the time information includes a start time and a duration for a contention phase, and wherein the station group configuration information includes information about a plurality of association identifiers (AIDs) used to identify a group of stations that are only allowed to access the contention phase indicated by the time information;

determine whether the station belongs to the group of stations indicated by the station group configuration information; and perform, via the RF unit, a contention with other stations in the group of stations during the contention phase when the station determines that the station belongs to the group of stations.

8. The station of claim 7, wherein the station determines that the station belongs to the group of stations if the station's AID matches with one of the plurality of AIDs indicated by the station group configuration information.

9. The station of claim 7, wherein the control information further includes frequency information indicating a frequency allocated to the group of stations.

10. The station of claim 7, wherein the contention is performed during the contention phase in order to transmit uplink data.

* * * * *